(12) United States Patent
Rothaut et al.

(10) Patent No.: US 8,762,124 B1
(45) Date of Patent: Jun. 24, 2014

(54) METHOD FOR THE MACHINE MAPPING, INTEGRATION, AND CONTROL OF ENTERPRISE PROCESSES

(75) Inventors: Martin Rothaut, Bonn (DE);
Karl-Heinz Lingenauber, Bonn (DE);
Oleg Kovrigin, Berlin (DE);
Erik-Oliver Masing, Berlin (DE)

(73) Assignee: Deutsche Telekom AG, Bonn (DE)

( * ) Notice: Subject to any disclaimer, the term of this patent is extended or adjusted under 35 U.S.C. 154(b) by 976 days.

(21) Appl. No.: 10/130,687

(22) PCT Filed: Nov. 15, 2000

(86) PCT No.: PCT/EP00/11268
§ 371 (c)(1),
(2), (4) Date: Feb. 21, 2003

(87) PCT Pub. No.: WO01/37151
PCT Pub. Date: May 25, 2001

(30) Foreign Application Priority Data

Nov. 18, 1999 (DE) .................. 199 554 481

(51) Int. Cl.
*G06F 9/45* (2006.01)
*G06F 17/30* (2006.01)
(52) U.S. Cl.
CPC .................. *G06F 17/30587* (2013.01)
USPC ................................ 703/22; 703/2
(58) Field of Classification Search
CPC ............ G06F 17/30587; G06F 17/30604
USPC ........................................... 703/22, 2
See application file for complete search history.

(56) References Cited

U.S. PATENT DOCUMENTS 5,301,320 A 4/1994 McAtee et al.

5,774,661 A 6/1998 Chatterjee et al.
(Continued)

FOREIGN PATENT DOCUMENTS

| CS | 2 656 387 | 6/1977 |
| DE | 196 09 889 | 2/1999 |

(Continued)

OTHER PUBLICATIONS

Egyed, Alexander; Kruchten, Philippe B.; "Rose/Architect: a tool to visualize architecture", Jan. 1999, Proceedings of the 32nd Annual Hawaii International Conference on System Sciences.*

(Continued)

*Primary Examiner* — Kamini S Shah
*Assistant Examiner* — Russ Guill
(74) *Attorney, Agent, or Firm* — Kenyon & Kenyon LLP

(57) ABSTRACT

A machine mapping, integration, and controlling of enterprise processes, products, and structures renders the modeling and control of the mutually coordinated individual elements of a total enterprise in terms of an overall system. The integrated methodology (ISM) is a multi-dimensional and multi-step model, which includes the total architectural model. It is made up of four hierarchical concept levels, each describing in integrative fashion the methodology of the procedure and the modeling. A metamodel may include a procedural model, a formal modeling language, and an integration of already existing modeling languages. Each element of a level in the total architectural model may include a defined, hierarchical or sequential number of expanded diagram types in which information on specific objects/entities is input and/or output via a graphical interface. Levels and elements including diagram types are provided with intersections of classes, whose entities are able to be considered, inputted, or updated by machine.

11 Claims, 1 Drawing Sheet

(56) References Cited

U.S. PATENT DOCUMENTS 5,781,911 A 7/1998 Young et al.
5,835,898 A 11/1998 Borg et al.

FOREIGN PATENT DOCUMENTS

EP 0797330 9/1997
GB 1561100 2/1980

OTHER PUBLICATIONS

Gane, Chris; Sarson, Trish; "Structured Systems Analysis: Tools and Techniques", 1979, Prentice-Hall.*
Russell, C.M.; Holladay, M.R.; Barnsley, P.B.; Martin, M.; Dobson, J.; "Enterprise Modeling the telecommunications industry", Apr. 1999, BT Technology Journal, vol. 17, No. 2.*
Nordstrom, Greg; Sztipanovits; Karsai, Gabor; Ledeczi, Akos; "Metamodeling—Rapid Design and Evolution of Domain-Specific Modeling Environments", Mar. 1999, Proceedings of IEEE Conference and Workshop on Engineering of Computer-Based Systems.*
Booch, Grady; "Object Oriented Design with Applications", 1991, Benjamin/Cummings Publishing.*
Wieringa, Roel, "A Survey of Structured and Object-Oriented Software Specification Methods and Techniques", Dec. 1998, ACM Computing Surveys, vol. 30, Issue 4.*
August-Wilhelm Scheer et al., "ARIS architecture and reference models for business process management", Jan. 2000, Springer-Verlag, pp. 376-389.*
Roger S. Pressman, "Software Engineering A Practitioner's Approach", fourth edition, 1997, McGraw-Hill Companies, pp. 24-25, 259-263, 378-387.*
F.B. Vernadat, "Enterprise Modeling and Integration: principles and applications", 1996, Chapman & Hall, pp. 1-189, 317-330.*
Douglas T. Ross et al., "Structured analysis for requirements definition", 1977, IEEE Transactions on Software Engineering, vol. SE-3, No. 1, pp. 6-15.*
Ulrich Frank, "MEMO:Visual languages for enterprise modeling," Jun. 1999, Institut fur Wirtshaftsinformatik, pp. 1-19.*
Peter Loos et al., "Process Orientation and Object-Orientation—An Approach for Integrating UML and Event-Driven Process Chains (EPC), " Mar. 1998, Institut fur Wirtshaftsinformatik, pp. 1-17.*
Peter Loos et al., "Object-Orientation in Business Process Modeling through Applying Event Driven Process Chains (EPC) in UML," 1998, Proceedings of Second International Enterprise Distributed Object Computing Workshop, 1998. pp. 102-112.*
August-Wilhelm Scheer, "Architecture of Integrated Information Systems," 1992, Springer-Verlag, 226 pages.*
Heinze et al., "Lautloser Tintendruck für Schreibstationen," Siemens-Zeitschrift, vol. 51, No. 4, 1977, pp. 219-221.

* cited by examiner

METHOD FOR THE MACHINE MAPPING, INTEGRATION, AND CONTROL OF ENTERPRISE PROCESSES

FIELD OF THE INVENTION

The present invention relates to a method for machine, or computerized, mapping, integration, and control of enterprise processes, products, and information technology (IT) structures as well as IT architectures.

BACKGROUND INFORMATION

It is believed that due to the globalization, mergers and acquisitions of companies, as well as specific instances of decentralization, enterprises increasingly find themselves confronted today with the task of having to quickly adapt their processes, products, and services to changing market conditions. The individual processes are supported on an internal-enterprise, or intra-corporate, basis and, to some extent, externally as well, by a complex IT infrastructure, and are carried out as partially or fully automated processes.

In this context, the IT infrastructure appears to become more and more closely meshed with the supporting processes, internal structures and product architectures, and, in some instances, with the process architecture.

Often, a process change is only effected by altering the IT infrastructure or the IT architecture and vice versa. In addition, for example, for companies in the telematics industry, a product is itself represented by an IT infrastructure or an IT architecture, or the IT infrastructure constitutes part or all of a product.

Process architecture is understood to be a model of coordinated processes and business structures, including, for example, process hierarchies, organigrams, and process models. IT architecture is understood to be a model of all systems, networks, software, hardware, etc. Product architecture is understood to be a model of all products, including, for example, hierarchies, components, IT support, etc. A product architecture, for example, may be the offer of an online service. Modeling is understood to be a mapping of real systems, such as enterprises in a computer system, and includes the description, management, graphical visualization and analysis of data by these systems. In the broader sense, a system is understood to be the entire enterprise, including external relations, the integrated information on the overall system becoming a vital prerequisite for its comprehensive description, analysis, and planning The complexities of the process world appear to depend so greatly on the IT infrastructure world, the product world and/or the product architecture, that a separate description, analysis, planning and optimization of any one of the three worlds would not do justice to the complexity of the situation. The result would, therefore, be altogether suboptimal, since such a subsystem, and not the overall system, would be adapted and/or optimized.

The reference it FOKUS 2/99, at pages 22-28, "Ein weiteres Schlagwort der Informationstechnologie? Knowledgemanagement" (i.e., "Another Buzzword of Information Technology? Knowledge management"), purportedly concerns some basic explanations regarding knowledge management in enterprises and administrative entities. Further, some theoretical problems and the actual practical problems are purportedly discussed in additional articles, such as, for example: "Knowledegemanagement Anwendungen, Märkte und Technologien" (i.e., "Knowledge Management Applications, Markets and Technologies"), 2/99, pages 32-35; "Herausforderung Wissensmanagement: Zwischen Wissen und Information" (i.e., "The Challenge of Knowledge Management: Between Knowledge and Information"),2/99, pages 29-30; "Wissensmanagement, eine Investition die sich auszahlt" (i.e., "Knowledge Management, An Investment That Pays Off"), 3/99, pages 36-38; "ETL-Tools, Datenaufbereitung für das Dataware House" (i.e., "ETL Tools, Data Preparation for the Dataware House"), 3/99, pages 14-22; "Media Daten, Repository als Drehscheibe" (i.e., "Media Data, Repository as Disk"), 3/99, pages 32-35; and it Management 10/98, pp. 38-42, under the title "Ganzheitliche Betrachtung des Software-Reengineering, ein Stiefkind im Unternehmen" (i.e., "Holistic View of Software Reengineering, a Stepchild in the Enterprise").

The articles listed show that subsystems have, in fact, been separately described, and that theoretical observations of the interdependencies of overall systems and structures have, in fact, been made, but, that there are no known, successful, integrated, computerized methods in existence for mapping and integrating, as well as controlling enterprise processes, i.e., integrated management of the processes, of the IT infrastructure and of the products.

Actual and consistent information on the elements, relations, and interdependencies of processes, architectures, on the supporting IT infrastructure and, in particular, in the case of telematics firms, also on the products, constitute the basis of a successful, integrated management of the "enterprise" system. When subsystems are separately described, without giving consideration to the interdependencies within the overall system, for example, of a global enterprise, information from other subsystems arc not able to be related to the former because of incongruencies in the models. Thus, integrated information on the overall system becomes a vital precondition for its comprehensive description, analysis, and planning As already explained, no methodology exists at the present time for modeling such a system, which would enable a global and integrated mapping using uniform models, formal notations, and relations.

SUMMARY OF THE INVENTION

The present invention provides a computerized method for mapping, integrating, and controlling enterprise processes, products, IT structures, and architectures, with the involvement of all systems, networks, and hardware and software.

Applying a method described here, the information pertaining to a system, for instance to an enterprise, is able to be managed in an integrated fashion using a uniform methodology. All information may now be mapped into models which describe the relations and interdependencies and thereby become the subject matter, consistent in methodology and content, of the information analysis and planning An integrated method of this kind fully encompasses the already existing methods and the models of the subsystems. An integrated methodology requires a method for changing/expanding the method itself and for describing procedural models on how these changes and/or expansions arc introduced and mapped into the methodology, as provided in the present invention.

The present invention makes it possible for virtually all information to exist in a central database and, through an application for input and output, to be made available to the user.

A technology, i.e., application and database, which supports the introduction and application of the integrated methodology, has the capability to map existing and new models and modeling methods in a relatively short time (metamodeling capability), to permit changes to and expansion of the methodology entailing minimal outlay, to render possible a multiplicity of views for different users with respect to information input and output, and, at any time, to permit expansions and to support large numbers of users for the inputting and outputting of information.

Such an integrated system methodology (ISM) (methods, procedures and technology) applied across the entire enterprise for the management of information, i.e., for description, analysis and planning, is described here as a corporate information base (CIB). Thus, a path to technically implementing a system design is shown, which is compatible with the modularity principle where the goal is to have reusable components and thereby attain cost advantages in comparison with the development and operation of monolithic application systems. In particular, cost savings are achieved in the reengineering area and in the redevelopment of applications, since already existing components are able to be more easily integrated. When applied, the ISM exhibits the following: support of the design process of the IT application landscape, with respect to componentware, identification and reusability of system components and technical functions (at the model level); support of communication between the technical side and IT (use of a uniform notation and coordinated procedural models); use of standards, such as EPCs, CORBA, common, common business objects, . . . ; development and use of special business objects; planning for the migration, expansion, and updating of the IT application landscape on the basis of actual/target scenarios; integration of the information management into the process organization; representation of the corporate-wide IT knowledge in a corporate information base and application of data mining methods for extracting knowledge (data warehouse); linking the corporate information base to the process of software creation through the integration of UML and case tools; overcoming the inherent failure of the method with regard to a business process-oriented and object-oriented approach; use of an open modeling technology, which not only builds upon a model, but provides all required views of the IT application landscape, and which is expandable with respect to all contents of the ISM; assignment of software components in IT systems to processes, with the goal of achieving cost transparency in subprocesses and in application development; possibilities of reverse engineering; support of the system management and configuration management; and cost savings, enhanced efficiency and implementation of a time-to-market strategy in the IT arca.

The ISM is made up of a number of iterative subprocesses at different levels. In this context, all process steps of a bottom level are carried out in recursive form for each process step of a top level.

The entire process is to be repeated, in turn, for each enterprise area, described as action field AF, to be integrated, in this context, the already realized core always being added to. The procedural model describes both the first-time system development, as well as the continuous change and adaptation process, which is also decisive for the quality and acceptance of the approach due to the fact that the enterprise and its environment are continuously changing. The ISM procedural model described further below has, for example, four levels: the implementation level, the model level, the model-development level, and the model-description level. In this context, it should also be considered that the ISM concept is a multi-dimensional and multi-step metamodel. The term methodology explains the distinction from the many approaches described in the technical literature, and thus clearly shows the innovation of the approach described here. ISM, not only places the modeling aspect in the focus of the metamodel, but also the procedural models which are integrated into the business processes, thereby supporting them. The metamodel is not only useable for the approach of the corporate-wide processes from a bird's-eye view, but itself is a component of the process conversion in an efficient IT application landscape. The ISM is essentially composed of two core areas which are described in general as a hybrid model, which combines existing approaches and expands them by adding new components, and procedural models used for converting the corporate-IT strategy and, thus, for controlling the entire enterprise.

In this context, the metamodel includes the total architectural model for the information systems, as well as innovative products, services, and networks. The four hierarchical levels each describe, integratively, the methodology of the procedure and the modeling. This total architectural model underlies the object-oriented paradigm. This means that everything is represented in the form of objects, even the processes and their components. The advantage of this procedure is that the possibility of specialization is given. In this manner, various views of the corporate information base may be generated, which present specific plans, for example, and thus relate to a procedural model.

A further advantage resides in the fact that the corporate information base may be expanded on an area-specific basis, without losing the consistency with respect to business processes.

DETAILED DESCRIPTION

Figure 1:
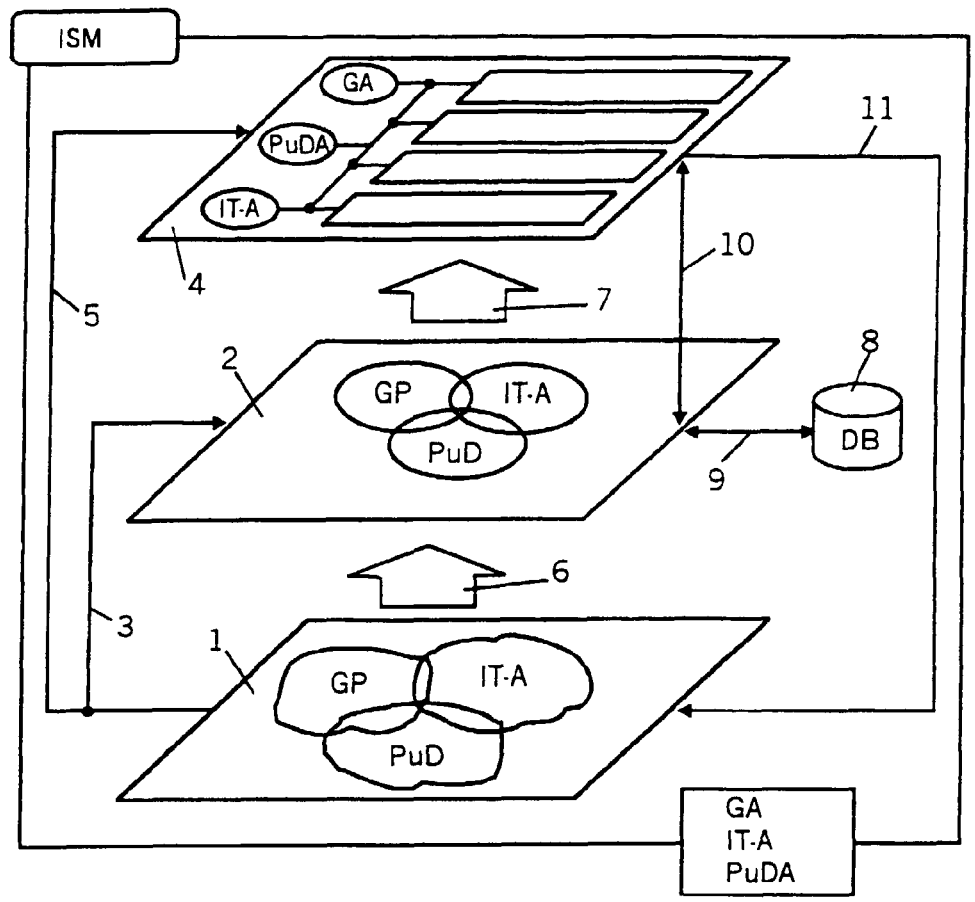
FIG. 1 shows a basic description of the modeling, in particular of the metamodeling.

FIG. 1 illustrates the integrated system methodology ISM on the basis of a telematics firm. Real world 1 is made up of business processes GP, IT architecture IT-A, as well as of the products and services PuD. Metamodel level 2, which is linked to the real world through metamodeling 3, includes the metamodels for business processes GP, IT architecture IT-A, and the products and services PuD. Moreover, real world 1 is linked to the user level 4 via modeling 5. User level 4 includes, for its part, the technical architecture, i.e., IT architecture IT-A, functional architecture PuDA for products and services, and business architecture GA. In this context, the elements of real world 1 are mapped via metamodeling 3 in metamodel level 2. Views and diagrams 7 are made available by metamodel level 2 to elements of user level 4.

The metamodel is contained in a database 8, which communicates via a read/write connection 9 with the elements of metamodel level 2 and, via a data output and input connection 10, with the elements of user level 4 and metamodel level 2. User level 4 is likewise linked to real world 1 via planning 11.

A technology (application and database) is actually created, which supports the introduction and application of the integrated methodology and, moreover, is able to map 6 existing and new models and modeling methods and, in fact, in metamodel level 2, to permit changes to and expansion of the methodology, while entailing minimal outlay, and which renders possible a multiplicity of views and diagrams 7 for different users with respect to information input and output 10, and, at any time, permits expansions, and supports a large numbers of users in user level 4 for the inputting and outputting of information 10.

As already explained, such an integrated methodology (methods, procedures and technology) makes available a corporate information base CIB on an enterprise-wide basis for the management of information, i.e., for description, analysis and planning.

Figure 2:
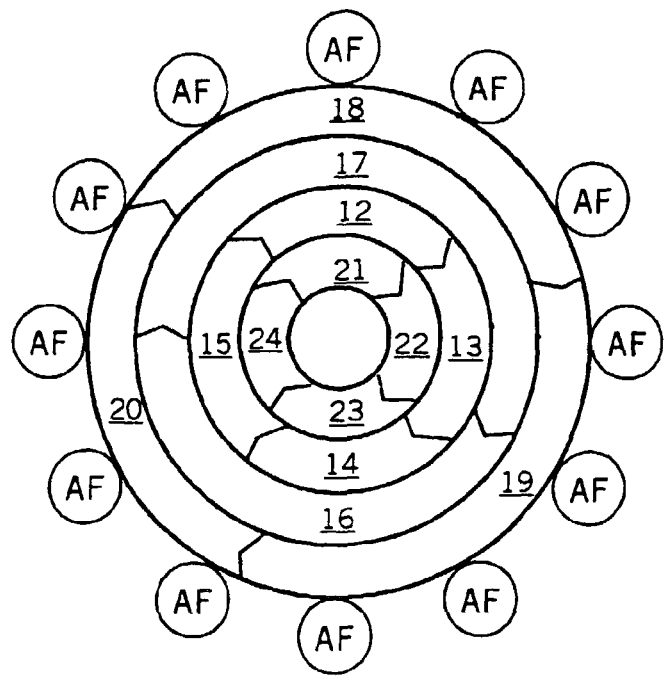
FIG. 2 shows an ISM procedural model.

FIG. 2 shows an embodiment of an ISM procedural model, and is made up of a number of iterative subprocesses at different levels. In this context, all process steps of a bottom level are carried out in recursive form for each process step of a top level. The entire process is to be repeated, in turn, for each enterprise area, described as action field AF, to be integrated, the already realized core always being added to. The procedural model describes both the first-time system development, as well as the continuous change and adaptation process, which is also decisive for the quality and acceptance of the approach due to the fact that the enterprise and its environment are continuously changing.

The following four levels are present in the ISM procedural model according to FIG. 1:
a) Implementation level
  Starting out from a prototypical approach 18, a pilot approach 19 is developed, which, upon acceptance, makes the transition to the active operation 20.
b) Model level
  It is necessary to first describe the problem area in abstract form which leads to the creation of a metamodel, which is then verified on the basis of practical models.
c) Model development level
  Here, the "meta" knowledge is initially ascertained, then verified and linked to the already existing system core, as well as subsequently adapted to its specifications.
d) Model description level
  Each individual model development step is, in turn, described 21, visualized 22, communicated 23, and optimized on the basis of results 24.

The processes are to be iteratively repeated, as processor-controlled processes, on each of the mentioned levels a) through d) until all requirements are met. As described, for each step of a level a) through d), the entire process of the next lower level must be carried out. In FIG. 1, the various levels and the particular process steps are shown, it being necessary to repeat the method for each action field AF.

Another exemplary embodiment is described in the following on the basis of the development of an application for the process analysis and the IT overall plan, as well as on the basis of their combination into a shared system.

The development process for this example is described on model development level c). Each of the steps to be thereby implemented on model description level d) are not clarified here, since they are known and are to be carried out for every system analysis.

Process analysis:
Initial situation for the example:
  The business processes of the enterprise are described on the uppermost process level, i.e., of the core processes.
Discovery 12:
  The method of the event-driven process chains (EPCs) is selected as a suitable method for recording and analyzing processes in the enterprise.
Verification 13:
  The enterprise processes are described via the event-driven process chains (EPCs).
Connection 14:
  See IT overall plan
Synchronization 15:
  Sec IT overall plan, as explained in the following:
Initial situation:
  A plurality of heterogenous databases exist for the recording of information processing systems IV.
  A VISIO graphics tool is used to visualize the database contents, employing a predefined notation on the basis of core processes.
Discovery 12:
  Models 16, processes and information, which are present from previous results, are analyzed, and a target definition is derived.
Verification 13:
  In accordance with the Visio images, a metamodel 17 is developed. On the basis of the metamodel 17, a model 16 is created using exemplary data and verified, together with the future users, in a plurality of workshops. In the process, the existing databases are successively imported and, in the same step, inconsistencies in the existing description are uncovered and eliminated.
Connection 14:
  The functions ascertained in the process analysis EPC are partially supported by information-processing systems IV covered in the IT overall plan. It is beneficial to jointly use the information ascertained in both areas. For this, it is necessary to expand the method of process analysis EPC and, in fact, by: the representation of the codes; the aggregation of functions into functional modules; and the description of information-processing systems IV in accordance with the requirements of the overall plan.
Synchronization 15:
  The applications for the process analysis and the IT overall plan are merged on the basis of a shared metamodel, so that, from both areas, the user is able to access information pertaining to the corresponding other area.

The concept of "product" is to be understood in the broadest sense, i.e., completed performances or services, which are identifiable by distinguishing properties, i.e., in the general sense, it is the result of a process. The product may be a marketable service in the actual sense of a product, but also an IT application, a platform, a new or to be modified platform component, a network functionality or a concept from these areas. The corporate information base for the integrated database management system (DBMS), analysis, planning, evaluation and monitoring of systems, structures and processes, also contains all methods, i.e., those existing as separate and integrated methods, as well as procedural methods, i.e., for applying, expanding, and integrating, as well as the technology, for example, database (DB)-supported and model-based.

Because the development occurs on the basis of a described flexible metamodel, a consistent expansion and improvement of an already existing system core is possible. In addition to this, proven and generally accepted methods and models are able to be integrated on the basis of the existing ones, in the various areas of an enterprise action field (AF) or enterprise area to be integrated.

What is claimed is:

1. A method for the machine mapping, integration, and controlling of a telecommunications enterprise system as basis for a program of a visual, semantic modeling of the enterprise system in a multi-dimensional and multi-stage metamodel, comprising:
  mapping all information relating to the enterprise by a machine into models which describe relations and interdependencies of the information;
  integrating the models with any already existing methods, models, and subsystems so that an integrated system methodology is produced, through information processing, for description, for analysis and planning of information technology architectures, product architectures, process architectures, and structures, which provide machine support for operations and activities, so that a visual, semantic modeling in a multi-dimensional and multi-stage metamodel made up of a number of iterative subprocesses at various levels, is provided including:

carrying out all process steps of a bottom level in recursive form for each process step of a top level; and repeating all process steps for each enterprise area to be integrated, always adding to an already realized core;

wherein a procedural model of the integrated system methodology includes:

an implementation level in which, starting out from a prototypical approach, a pilot approach is developed, which, up on acceptance, makes a transistion to active operation;

a metamodel level in which a problem area is described in abstract form;

a model-development level where necessary metaknowledge is ascertained, then verified and linked to an already existing system operation, and subsequently adapted to its specifications; and a model-description level where each individual model development step is described, visualized, communicated, and optimized on basis of results, processes being iteratively repeated, as processor-controlled processes, on each of the mentioned levels, until all requirements are met.

2. The method as recited in claim 1, wherein an integrated system methodology procedural model for telecommunications enterprises has an implementation level, a metamodel level, a model-development level, and a model-description level, and further comprising:

iteratively repeating all processes on each level until all requirements are met; and carrying out, for each step of a level, an entire process of a next lower level.

3. The method as recited in claim 1, wherein the metamodel includes a total architectural model for an information system, products, services, and networks; and wherein four hierarchical levels each implement, integratively, a methodology of procedure and modeling.

4. The method as recited in claim 1, wherein an architectural model of the integrated system methodology has an object-oriented design.

5. The method as recited in claim 4, wherein the architectural model, including the processes and process components, is represented in the form of objects.

6. The method as recited in claim 1, further comprising:

storing the metamodel in a database, which communicates via a read/write connection with elements of a metamodel level and, via a data output and input connection with elements of a user level and the metamodel level; and integrating the user level with the level of the real world via a planning connection.

7. The method as recited in claim 1, wherein a procedural model of the integrated system methodology has a number of iterative subprocesses in different levels, and includes:

carrying out all process steps of a bottom level in recursive form for each process step of a top level;

repeating all processes for an enterprise area to be integrated; and implementing first-time system development, continuous change and adaptation processes.

8. A method for the machine mapping, integration, and controlling of enterprise processes, products, information technology structures, and information technology architectures, for an enterprise system as the basis for a program of a visual, semantic modeling of the enterprise system in a multi-dimensional and multi-stage metamodel, comprising:

mapping all information relating to the enterprise by a machine into models which describe relations and interdependencies of the information;

integrating the models with any already existing methods, models, and subsystems so that an integrated system methodology is produced, through information processing, for description, for analysis and planning of the information technology architectures, product architectures, process architectures, and structures, which provide machine support for operations and activities, so that a visual, semantic modeling in a multi-dimensional and multi-stage metamodel made up of a number of iterative subprocesses at various levels, is provided including:

carrying out all process steps of a bottom level in recursive form for each process step of a top level; and repeating all process steps for each enterprise area to be integrated, always adding to an already realized core, linking, in a level, a real world, composed of business processes, an information technology architecture, products, and services, via a metamodeling to a metamodel level, the metamodels for business processes including the information technology architecture, the products and the services;

linking the level of the real world to a user level via a modeling, the user level including the information technology architecture, a functional architecture for products and services, and business architecture; and mapping elements of the real world via the metamodeling in metamodel level;

wherein a procedural model of the integrated system methodology includes:

an implementation level in which, starting out from a prototypical approach, a pilot approach is developed, which, upon acceptance, makes a transistion to active operation;

a metamodel level in which a problem area is described in abstract form;

a model-development level where necessary metaknowledge is ascertained, then verified and linked to an already exiting system operation, and subsequently adapted to its specifications; and a model-description level where each individual model development step is described, visualized, communicated, and optimized on basis of results, processes being iteratively repeated, as processor-controlled processes, on each of the mentioned level, until all requirements are met.

9. The method as recited in claim 8, wherein views and diagrams are made available by a metamodel level to elements of the user level.

10. A method for the machine mapping, integration, and controlling of enterprise processes, products, information technology structures, and information technology architectures, for an enterprise system as the basis for a program of a visual, semantic modeling of the enterprise system in a multi-dimensional and multi-stage metamodel, comprising:

mapping all information relating to the enterprise by a machine into models which describe relations and interdependencies of the information;

integrating the models with any already existing methods, models, and subsystems so that an integrated system methodology is produced, through information processing, for description, for analysis and planning of the information technology architectures, product architectures, process architectures, and structures, which provide machine support for operations and activities, so that a visual, semantic modeling in a multi-dimensional and multi-stage metamodel made up of a number of iterative subprocesses at various levels, is provided including:
  carrying out all process steps of a bottom level in recursive form for each process step of a top level; and
  repeating all process steps for each enterprise area to be integrated, always adding to an already realized core,
wherein a procedural model of the integrated system methodology includes:
  an implementation level in which, starting out from a prototypical approach, a pilot approach is developed, which, upon acceptance, makes a transition to active operation;
  a metamodel level in which a problem area is described in abstract form;
  a model-development level where necessary metaknowledge is ascertained, then verified and linked to an already existing system operation, and subsequently adapted to its specifications; and
  a model-description level where each individual model development step is described, visualized, communicated, and optimized on basis of results, processes being iteratively repeated, as processor-controlled processes, on each of the mentioned levels, until all requirements are met.

11. A method for the machine mapping, integration, and controlling of enterprise processes, products, information technology structures, and information technology architectures, for an enterprise system as the basis for a program of a visual, semantic modeling of the enterprise system in a multi-dimensional and multi-stage metamodel, comprising:
  mapping all information relating to the enterprise by a machine into models which describe relations and interdependencies of the information;
  integrating the models with any already existing methods, models, and subsystems so that an integrated system methodology is produced, through information processing, for description, for analysis and planning of the information technology architectures, product architectures, process architectures, and structures, which provide machine support for operations and activities, so that a visual, semantic modeling in a multi-dimensional and multi-stage metamodel made up of a number of iterative subprocesses at various levels, is provided including:
    carrying out all process steps of a bottom level in recursive form for each process step of a top level; and
    repeating all process steps for each enterprise area to be integrated, always adding to an already realized core,
  wherein a procedural model of the integrated system methodology includes:
    an implementation level in which, starting out from a prototypical approach, a pilot approach is developed, which, upon acceptance, makes a transition to active operation;
    a metamodel level in which a problem area is described in abstract form;
    a model-development level where necessary metaknowledge is ascertained, then verified and linked to an already existing system operation, and subsequently adapted to its specifications; and
    a model-description level where each individual model development step is described, visualized, communicated, and optimized on basis of results, processes being iteratively repeated, as processor-controlled processes, on each of the mentioned levels, until all requirements are met, repeating all processes for an enterprise area to be integrated; and
  implementing first-time system development, continuous change and adaptation processes.

* * * * *

UNITED STATES PATENT AND TRADEMARK OFFICE
CERTIFICATE OF CORRECTION

PATENT NO. : 8,762,124 B1  
APPLICATION NO. : 10/130687  
DATED : June 24, 2014  
INVENTOR(S) : Martin Rothaut et al.

Page 1 of 1

It is certified that error appears in the above-identified patent and that said Letters Patent is hereby corrected as shown below:

On the title page item 30 Foreign Application Priority Data, change "199 554 481", to -- 199 554 481.1 --;

In the specification

Column 2, line 31, change "subsystems arc not able", to -- subsystems are not able --;

Column 2, line 35, change "and planning As", to -- and planning. As --;

Column 2, line 52, change "planning An inte-", to -- planning. An inte- --;

Column 2, line 57, change "expansions arc introduced", to -- expansions are introduced --;

Column 3, line 46, change "in the IT arca", to -- in the IT area --;

Column 5, line 43, change "it being necessary", to -- it is being necessary --;

Column 6, line 2, change "Sec IT overall", to -- See IT overall --;

In the claims

Column 7, line 17, change "which, up on acceptance", to -- which, upon acceptance --;

Column 8, line 37, change "in metamodel level", to -- in the metamodel level --;

Column 8, line 54, change "the mentioned level", to -- the mentioned levels --.

Signed and Sealed this  
Seventeenth Day of November, 2015

Michelle K. Lee  
*Director of the United States Patent and Trademark Office*